United States Patent [19]

Weiberg, Jr.

[11] Patent Number: 4,648,197
[45] Date of Patent: Mar. 10, 1987

[54] FISHING LINE HANDLER

[76] Inventor: Frederick C. Weiberg, Jr., 1225 Brentwood Dr., Evansville, Ind. 47715

[21] Appl. No.: 808,611

[22] Filed: Dec. 13, 1985

[51] Int. Cl.$^4$ .............................................. A01K 89/00
[52] U.S. Cl. ........................................................ 43/25
[58] Field of Search ............................... 43/25; 30/232

[56] References Cited

U.S. PATENT DOCUMENTS

| | | | |
|---|---|---|---|
| 693,753 | 2/1902 | Starrett | 30/232 |
| 2,561,289 | 7/1951 | Paris | 43/25 |
| 3,128,023 | 4/1964 | Cook | 43/25 |
| 3,164,334 | 1/1965 | Gris | 43/25 |
| 3,521,393 | 7/1970 | Gordon | 43/25 |
| 4,023,299 | 5/1977 | Maserang et al. | 43/25 |

FOREIGN PATENT DOCUMENTS

| | | | |
|---|---|---|---|
| 452858 | 3/1913 | France | 30/232 |
| 539280 | 2/1956 | Italy | 30/232 |
| 3194 | of 1881 | United Kingdom | 30/232 |

Primary Examiner—M. Jordan
Attorney, Agent, or Firm—Warren D. Flackbert

[57] ABSTRACT

A fishing line handler typically used in conjunction with a conventional fishing rod characterized by a base supported cutter blade mechanism and one or more retainer or clamping members for selective fishing line engagement and retention. The instant handler serves both clamping, cutting and trimming purposes and frees the fisherman's hands for lure selection while, at the same time, containing the fishing line at a readily accessible location. The handler is arranged so that the cutter mechanism is normally urged into a non-cutting condition, i.e. a cutting blade thereof must be moved against the force of a spring to achieve fishing line cutting or trimming.

4 Claims, 4 Drawing Figures

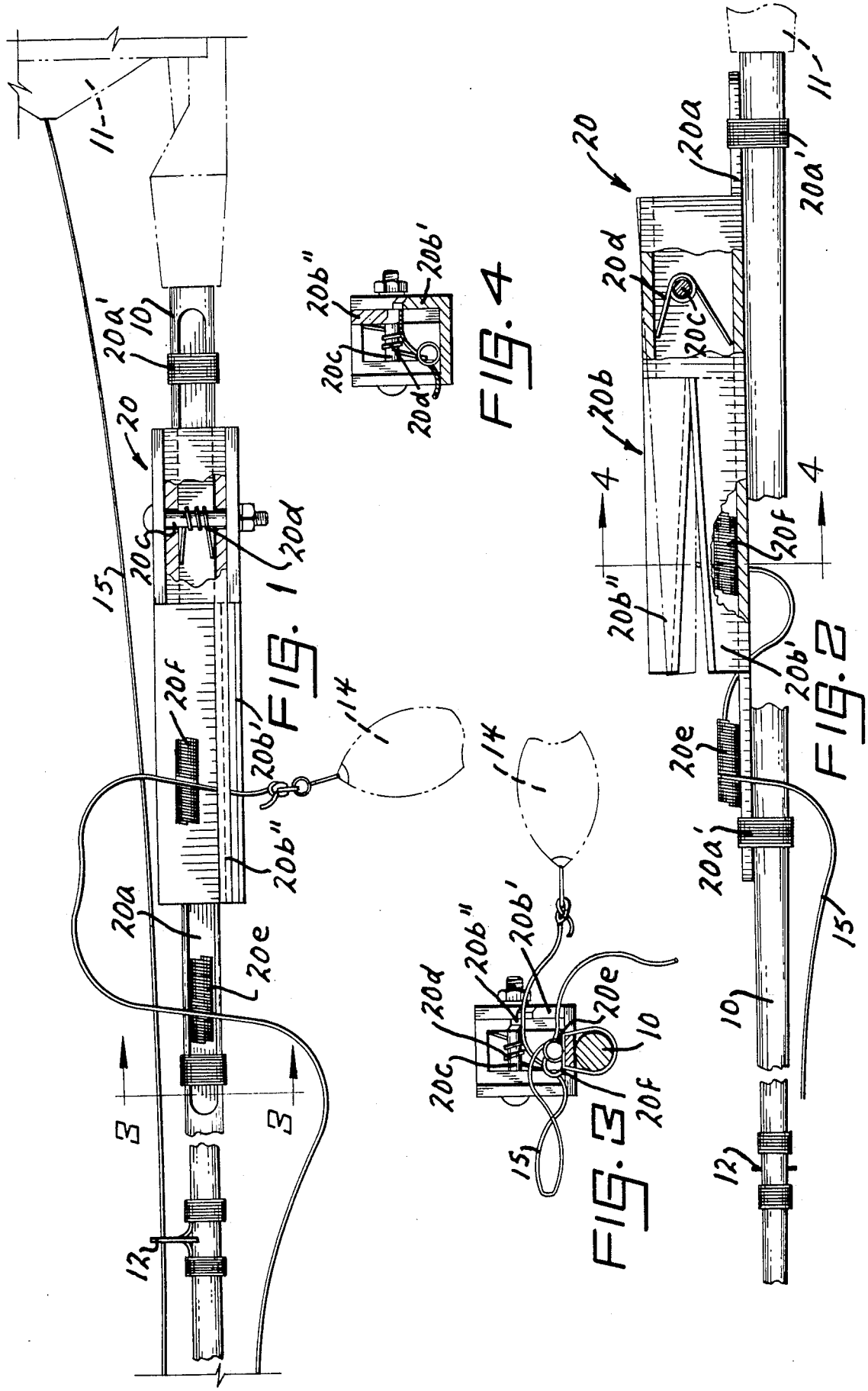

FISHING LINE HANDLER

As is known, the popularity of fishing is widespread, where, however, a particular problem is involved in the changing of a lure while fishing. In this connection, and typically, the fisherman must locate the needed clippers or pliers in his tackle box and, thereafter, cut the fishing line and remove the lure. At this point, the line is free to fly in the wind and is sometimes difficult to retrieve. In that the fisherman generally uses both hands to remove the lure from the fishing line and select a new lure, it is difficult, if at all possible, to hold the unsecured fishing line during the procedure.

Moreover, after securing and tieing the fishing line to another lure, the fisherman must then employ clippers to trim any excess line from the lure, and upon returning the clippers to storage, as the tackle box, fishing can be resumed. In other words, various operational stages are involved for lure substitution, i.e. line cutting, lure replacement and line trimming.

The invention overcomes the aforesaid difficulties, serving significant simplification. In this connection, the fishing line handler herein is, typically, directly secured onto the fishing rod, making the handler readily available for use. Actually, the handler is defined by a cutter mechanism mounted on a base, with a movable cutting arm or blade of the mechanism being normally urged away from a cutting condition. The base also includes wound wire segments, as in the form of springs, which serve to retain or clamp the fishing line during the desired replacement lure selection. As will become evident, the clamping or securing of the fishing line by the retainer members, or wound wire segments, affords latitude and/or freedom of hands during the fisherman's usage of the handler.

In any event, a better understanding of the present invention will become more apparent from the following description, taken in conjunction with the accompanying drawing, wherein FIG. 1 is a top plan view, partly fragmentary and partly in phantom, showing a fishing line handler in accordance with the teachings of the present invention;

FIG. 2 is a view in side elevation, also fragmentary but partially in vertical section, of the instant fishing line handler, looking from the bottom to the top of FIG. 1;

FIG. 3 is a cross-sectional view, taken at line 3—3 on FIG. 1 and looking in the direction of the arrows, detailing the invention; and, FIG. 4 is another cross-sectional view, in this instance taken at line 4—4 on FIG. 2, further detailing the invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the fishing line handler of the invention is typically shown in conjunction with a fishing rod 10, where the latter extends from a rod handle-reel assembly 11 (shown in phantom) and includes customary guides 12 (only one shown) along the rod 10. A fishing line 15 extends from assembly 11, through the guides 12 and terminates at a lure 14 (shown in phantom). The preceding arrangement of components is customary.

The instant fishing line handler 20 is defined by a base 20a conventionally secured, at 20a', to the fishing rod 10. The base 20a mounts a cutter mechanism 20b defined by a fixed cutting arm or blade 20b' and a movable cutting arm or blade 20b'', pivotal on the shaft of a bolt 20c extending through the rear portion of each. A spring member 20d encircles the aforesaid bolt 20c shaft and serves to urge the movable cutting blade 20b'' into a non-cutting condition, i.e. away from the fixed cutting blade 20b' (see FIG. 4). Additionally, and importantly, retainer members 20e and 20f, selectively usable, in the form of wound wire, are mounted onto base 20a or the cutter mechanism 20b and retainer member 20f may be on a separate base (not shown) which is releasably detached from base 20a carrying retainer member 20e. The retainer members 20e and 20f could be commonly known helical springs but, in any event, each serves to selectively receive and secure or clamp the fishing line 15 between adjacent passes.

In use, and when it is desired to change a lure, the fisherman typically places the fishing line 15 in retainer member 20f and, thereafter, cuts the fishing line 15 through action of cutting blade 20b''. At this point, the lure 14 has been removed and the fishing line 15 is still in a retained position, i.e. locked or clamped into the retainer member 20f. The fisherman can then select another lure and, after releasing the fishing line from the retainer member 20f, attach the replacement lure for subsequent use. In other words, the problem of a dangling or wind blown fishing line 15 is overcome because of the provision of the retainer member 20f.

In another form of usage, the fishing line 15 can be clamped into position in retainer member 20e and the lure cut for replacement, i.e. with or without the need of using retainer member 20f. Thus, in this instance, the fishing line 15 is still in a clamped and accessible location, and in a length sufficient for ready replacement lure tieing. In either approach, however, trimming of line 15 is readily and conveniently accomplished after the new or replacement lure is tied to the end thereof.

As should be evident, the invention simplifies the lure changing procedure, eliminating the locating and returning of clippers or pliers from the usual tackle box. The fisherman's hands are free for substitute lure selection and the line is effectively secured against loss or movement, as by wind conditions or the like.

The fishing line handler described above is susceptible to various changes within the spirit of the invention, including, for example, in proportioning; the fact that the handler is capable of independent use, where, for example, the base may be secured to an adjacent surface, such as that of the rod handle or the reel; the location of the retainer members with respect to each other; and, the like. Thus, the preceding should be considered illustrative and not as limiting the scope of the following claims:

I claim:

1. A fishing line handler comprising a base disposed on a fishing rod forming a first cutter blade, and a second cutter blade disposed above and parallel to said base and said fishing rod and pivotal on said base by a pin and spring assembly.

2. A fishing line handler comprising a base disposed on a fishing rod forming a first cutter blade, a second cutter blade disposed above and parallel to said base and said fishing rod and pivotal on said base by a pin and spring assembly, and a fishing line retainer member disposed along said fishing rod proximate said first and said second cutter blades.

3. The fishing line handler of claim 2 where said fishing line retainer member serves a clamping relationship.

4. The fishing line handler of claim 2 where said fishing line retainer member is in the form of a helical spring, and where the fishing line is retained between adjacent passes thereof.

* * * * *